Patented June 26, 1951

2,558,498

UNITED STATES PATENT OFFICE 2,558,498

DECALIN-HYDROPEROXIDE · CATALYZED REACTION BETWEEN SULFUR-DIOXIDE AND RUBBERY POLYMERS OF DIOLEFINS

Gottfried Ernst Rumscheidt, Amsterdam, Netherlands, assignor to Shell Development Company, San Francisco, Calif., a corporation of Delaware No Drawing. Application November 26, 1947, Serial No. 788,312. In the Netherlands November 27, 1946

6 Claims. (Cl. 18—54)

1

This invention relates to the formation of reaction products between high molecular weight unsaturated compounds and inorganic acid compounds, and it is particularly concerned with the provision of materials useful in promoting or accelerating the formation of such reaction product.

The term "high molecular weight unsaturated compounds," as employed herein, is intended to embrace compounds having a molecular weight of at least about 5,000 which are polymers of organic compounds containing a plurality of unsaturated linkages in the molecule, or which are copolymers of such compounds with other unsaturated organic compounds of one type or another. The term includes natural rubbers as well as unsaturated synthetic rubbers. It is contemplated that the various high molecular weight unsaturated compounds may incorporate one or more of various modifying ingredients, as plasticizers, fillers, coloring agents, inflammability reducers, and the like.

High molecular weight polymers include polymerization products of butadiene and those of its homologues and derivatives, as, for example, methyl butadiene polymers, dimethyl butadiene polymers, pentadiene polymers, and chloroprene polymers (neoprene synthetic rubber).

Representative copolymers of high molecular weight which come within the term are those formed from butadiene, its homologues and derivatives, with other unsaturated organic compounds. Among the latter are the acetylenes, as vinyl acetylene; olefins, as isobutylene which copolymerizes with butadiene to form butyl synthetic rubber; the vinyls, as vinyl chloride, acrylic acid, acrylonitrile (which polymerizes with butadiene to form the synthetic rubber Buna N), methacrylic acid, and styrene, the latter copolymerizing with butadiene to form the synthetic rubber Buna S; as well as the vinyl esters and various unsaturated aldehydes, ketones and ethers, as acrolein, methyl isopropenyl ketone, and vinyl ethyl ether.

The various forms of natural rubber and its unsaturated derivative compounds, including latex, crepe, sheet, caoutchouc, gutta percha, balata, and cyclo rubbers are also suitable unsaturated high molecular weight materials.

The above-defined, unsaturated high molecular

2 weight materials may also be termed "multiple unsaturated, diene-derivative hydrocarbons of high molecular weight." Alternatively, these high molecular weight, polysaturated materials, including both natural as well as synthetic rubbers, may be defined as "rubbery polymers of at least one compound selected from the group consisting of the conjugated diolefins and chloroprene."

The high molecular weight unsaturated compounds lend themselves well to the production of various shapes, including those of a continuous, non-supported nature as filaments, rods, strips, sheets, and the like. In preparing continuous objects of this character, the normal practice is to dissolve the high molecular weight material in a solvent and to inject the resulting solution into a coagulating bath in which the high molecular weight compound is insoluble. Other objects can be produced by flowing the solution onto a support and there precipitating the solution through evaporation of the solvent. Processes of this nature are set forth in detail, for example, in U. S. Patents No. 2,185,656, issued January 2, 1940, No. 2,198,927, issued April 30, 1940 and No. 2,288,982, issued July 7, 1942, and reference is hereby made to the said patents for a disclosure of the methods described.

Even in the unformed condition the unsaturated high molecular weight compounds have a wide variety of uses, they being employed, for example, as constituents of many paints and varnishes.

It is known that improved results can generally be obtained if the unsaturated high molecular weight compounds employed are caused to react with one or more inorganic acidifying compounds. For example, the tensile strength of filaments and similar shapes is greatly enhanced as a result of such treatment, and at the same time their elongation when stressed to fracture is reduced. It should also be noted that as a result of treatment with the acidifying compound there is eliminated a certain amount of tackiness often present on the surface of objects newly formed from high molecular weight compounds, thereby increasing the ease with which the said objects may be handled.

As employed herein, the term "inorganic acidifying compound" embraces the various inorganic

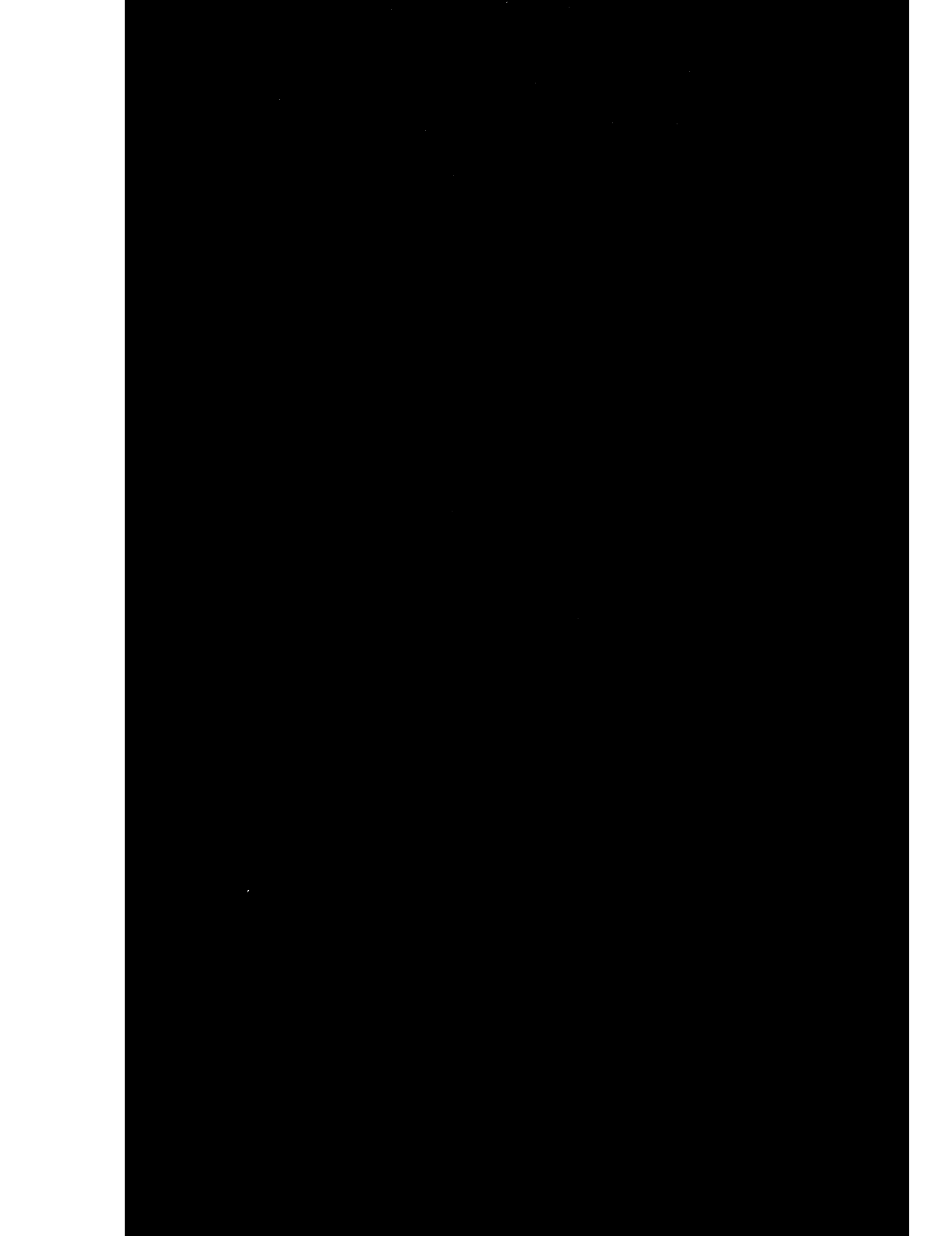

of the aromatic double bonds have been hydrogenated. These saturated (alicyclic) hydroperoxides are somewhat more efficient in their action than are some of the other compounds disclosed herein, a feature which is particularly true in the case of decalin hydroperoxide, a compound which I prefer to use wherever possible with both natural and synthetic rubbers.

The various hydroperoxides disclosed herein may be produced by any convenient method. Many of them can be made by hydrogenating the corresponding unsaturated aromatic compounds and thereafter forming the hydroperoxide, for example, while others are formed during oxidation of such materials as hexene or a like unsaturated compound. In many cases it is difficult to separate the hydroperoxide from the solution or reaction mixture in which it is formed. This need offer no difficulty insofar as the present invention is concerned, however, for it has been found that substantially the same improvement as regards increase in the ratio of reactive inorganic acidifying compound to high molecular weight unsaturated compound may be obtained through use of the hydroperoxides in their unseparated state. While this will often entail using hydroperoxides wherein less than half of the aromatic double bonds have been hydrogenated, that fact is immaterial so long as the more saturated aromatic hydroperoxides are present.

In carrying out the process of this invention the hydroperoxide, which term is also meant to include a hydroperoxide-containing mixture or solution, may be added to either the unsaturated high molecular weight compound or the inorganic acidifying compound, and it may even be added to a system containing both of said compounds in the unreacted state. Preferably, however, the hydroperoxide is added directly to the unsaturated high molecular weight compound, or in the case of mixtures containing more than one such compound, to at least one thereof, before the unsaturated compound is reacted with the inorganic acidifying compound. In this way activation of all portions of the unsaturated reactant is assured. Much the same results can also be obtained by treating with hydroperoxide those compounds from which the unsaturated high molecular weight compounds are derived, as butadiene and pentadiene, or by treating partially formed high molecular weight polymers and copolymers. However, since it is the normal practice to react the already formed high molecular weight unsaturated compound with the acidifying compound, reference will hereinafter be made only to the treatment of said already formed polymeric materials.

The unsaturated high molecular weight reactant may be activated by the hydroperoxide when the former is in either the dissolved, swollen, or solid state. In the preferred practice of the invention, however, a solution or dispersion of the high molecular weight compound is formed and the hydroperoxide is added thereto, the normal procedure being to select a dispersent or solvent in which the particular hydroperoxide employed is also soluble. For example, butadiene polymers or natural rubber can be dissolved in materials such as octane, benzene, cyclohexene, dioxane, or ethyl acetate, for example, and then a hydroperoxide such as decalin hydroperoxide can be added to the resulting solution to activate the dissolved polymeric ingredient. The resulting activation is achieved at room temperatures and under normal atmospheric conditions, it being substantially complete in but a fraction of a second.

It is possibly to vary widely the conditions under which such activated solutions may be reacted with the acidifying compound. If, for example, sulfur dioxide is introduced in either the gaseous, liquid or dissolved state into a solution of the activated polymeric material, a jell-like reaction product is obtained which can either be dried into the desired solid form or be used in the liquid condition, as it finishes of one type or another. On the other hand, when solutions of the activated material are injected or otherwise introduced into a bath containing sulfur dioxide dissolved in a liquid, as a water-alcohol mixture, in which the activated material is insoluble or but slightly soluble, there are precipitated semi-solid reaction products such as filaments and the like. Again, the reaction may take place when sulfur dioxide is brought into contact with sheets or deposited layers of the activated material in the dissolved condition.

If the unsaturated high molecular weight compound is to be reacted in the solid state, it may be activated through blending with the hydroperoxide in a grinding, kneading, or rolling mill adapted for the purpose. The resulting blended product may then be brought into reactive contact with the acidifying material as, for example, by dispersing said product in a sulfur dioxide-containing solution.

It is also possible to react the unsaturated high molecular weight material with an acidifying compound when the said unsaturated reactant is in the swollen state due to the presence of absorbed solvent. In this case activation is brought about either by adding the hydroperoxide to the already swollen product, as a thread, filament or the like, or by first adding the hydroperoxide to the solvent before the latter is introduced into the material, as by a soaking step. Suitable swelling agents for this purpose are the solvents mentioned above, as benzene or dioxane, together with such other known swelling agents as tricresyl phosphate and various high boiling petroleum fractions and extracts.

Due to the fact that activation of the unsaturated high molecular weight compound by the hydroperoxides described herein proceeds at a rapid rate and is in fact substantially instantaneous in most cases, it is possible to obtain good results simply by introducing the high molecular weight material in either the dissolved, swollen, or solid state into a liquid system containing both the hydroperoxide activating agent as well as the inorganic acidifying compound with which the high molecular weight material is to be reacted. For example, a solution of butadiene polymer or natural rubber in benzene may be introduced into a water-ethanol solution containing dissolved sulfur dioxide and decalin hydroperoxide. Here the polymeric material introduced in solution form is precipitated on contact with the water-ethanol solution and at the same time, under the influence of the hydroperoxide, it reacts with relatively large quantities of the sulfur dioxide.

It is difficult to set particular limits on the proportions of hydroperoxide to use with any given amount of the unsaturated high molecular weight compound. For example, a quantity of as little as 0.1% by weight of decalin hydroperoxide, based on the weight of the unsaturated compound present, often serves to activate such materials as butadiene polymers and natural rubbers to such an extent as that will react with substantial quantities of sulfur dioxide or other acidifying compound. On the other hand, it is preferred to employ from 1 to 15% of the hydroperoxide activating agent. While larger amounts of hydroperoxide than this may facilitate the reaction to a slightly greater extent, the use of abnormally large amounts of hydroperoxide (as quantities above 25 or 30%) is normally avoided since there is then some danger of depolymerizing the high molecular weight unsaturated reactant. The percentages expressed herein and in the following examples and claims for the hydroperoxide additive are based on the amount of the unsaturated, high molecular weight reactant which is present.

The following examples serve to illustrate the invention in various of its preferred embodiments:

*Example I*

A solution was prepared containing 6% by weight of plasticized, latex, crepe rubber in a solvent made up of equal parts by volume of benzene and toluene. To various portions of the solution thus obtained decalin hydroperoxide was added in amounts varying from 0 to 15%, calculated, as indicated above, on the weight of rubber present. The resulting solutions were then injected into an aqueous coagulating bath containing 80% ethyl alcohol by volume together with dissolved sulfur dioride in the amount of 100 grams per liter, the bath being maintained at 0° C. The filament-like coagulation products obtained as a result of the foregoing injection step were then washed and dried, after which their sulfur content was determined. It was found that the sulfur content of the dried products had risen as the quantity of hydroperoxide used increased, until with 5% decalin hydroperoxide a maximum sulfur content of 15% by weight was attained.

For the sake of comparison other filaments were made using the same rubber solution and reaction conditions as described above except that tetralin hydroperoxide was added instead of decalin hydroperoxide. Here, too, the coagulum showed a sulfur content which rose as the quantity of hydroperoxide catalyst increased, but the increase of the sulfur content was much more gradual than that observed when decalin hydroperoxide was used as the activating agent. For example, with 5% tetralin hydroperoxide the quantity of sulfur in the dried filament materials was only 8.7% by weight as compared with a weight percentage of 15% when using 5% of decalin hydroperoxide. With 10% tetralin hydroperoxide the quantity of sulfur had increased to but 10%, and even with 15% of the hydroperoxide, only to 10.8% sulfur.

*Example II*

This operation was conducted using the same rubber solution as described in Example I above, with 15% decalin hydroperoxide being added thereto. The resulting solution was then coagulated into filament-like shapes as it was injected into a water-alcohol bath (80% ethanol by volume) containing 300 grams of dissolved sulfur dioxide per liter and maintained at —5° C. On washing and drying the coagulum, a product containing 21.6% by weight sulfur was obtained.

*Example III*

Polybutadiene obtained by polymerization of butadiene with sodium as a catalyst was dissolved in a mixture of equal parts by a volume of benzene and toluene up to a concentration of 6% by weight. To the resulting solution was then added 15% decalin hydroperoxide (calculated on the amount of polybutadiene present), and the resulting material was then injected into a water-alcohol coagulating bath (80% by volume ethanol) containing 300 grams sulfur dioxide per liter and maintained at 0° C. The resulting coagulum, when dried, contained 18.4% by weight sulfur.

In order to ascertain the influence of proportions of decalin hydroperoxide exceeding 15%, another operation was carried out in which an amount of decalin hydroperoxide equal to the polybutadiene was added to the solution. The use of this large amount of hydroperoxide served to increase the sulfur content of the resulting product to but 19.7% by weight. The rubber solution and reaction conditions employed in this operation were the same as those described in the preceding paragraph.

I claim as my invention:

1. In a process of forming a reaction product between a natural rubber compound and sulfur dioxide, the step comprising bringing said rubber compound into reactive engagement with sulfur dioxide in the presence of from 1 to 15% decalin hydroperoxide, based on the amount of rubber compound present.

2. In a process of forming a reaction product between a butadiene polymer and sulfur dioxide, the step comprising bringing said polymer into reactive engagement with sulfur dioxide in the presence of from 1 to 15% decalin hydroperoxide, based on the amount of butadiene polymer present.

3. In a process of forming a reaction product between butadiene polymer and sulfur dioxide, the steps comprising forming a solution of said polymer, adding to said solution of quantity of decalin hydroperoxide equivalent to from 1 to 15% by weight of the amount of polymer present therein, and bringing said peroxide-containing solution into reactive engagement with a sulfur dioxide-containing medium to form said reaction product.

4. In a process of forming a reaction product between natural rubber and sulfur dioxide, the steps comprising forming a solution of said rubber, adding to said solution a quantity of decalin hydroperoxide equivalent to from 1 to 15% by weight of the amount of rubber present therein, and bringing said peroxide-containing solution into reactive engagement with a sulfur dioxide-containing medium to form said reaction product.

5. In the process for producing filaments, the steps comprising forming a solution of a rubbery polymer of a compound selected from the group consisting of conjugated diolefins and chloroprene; adding decalin hydroperoxide to said solution; and thereafter extruding the resulting solution into a coagulating bath containing available sulfur dioxide, the extruded rubbery polymer there reacting with the sulfur dioxide to form an insoluble, filamentary reaction product.

6. In a process of forming a reaction product between sulfur dioxide and a rubbery polymer of a compound selected from the group consisting of conjugated diolefins and chloroprene, the step comprising bringing said polymer into reactive engagement with sulfur dioxide in the presence of from 1 to 15% decalin hydroperoxide, based on the amount of polymer present.

GOTTFRIED ERNST RUMSCHEIDT.

REFERENCES CITED

The following references are of record in the file of this patent:

UNITED STATES PATENTS

| Number | Name | Date |
|---|---|---|
| 1,925,879 | Oenslager | Sept. 5, 1933 |
| 2,212,786 | McQueen | Aug. 27, 1940 |
| 2,258,423 | Rust | Oct. 7, 1941 |
| 2,265,722 | de Nie | Dec. 9, 1941 |
| 2,469,847 | Rumscheidt | May 10, 1949 |

FOREIGN PATENTS

| Number | Country | Date |
|---|---|---|
| 898,576 | France | July 10, 1944 |

OTHER REFERENCES

Union Bay State: Chemical Industries, 55, page 265 (Aug. 1944).